United States Patent [19]
Lehmann

[11] 3,879,827
[45] Apr. 29, 1975

[54] ROLL FOR A ROLLING MILL

[75] Inventor: Rolf Lehmann, Mutschellen/AG, Switzerland

[73] Assignee: Escher Wyss Limited, Zurich, Switzerland

[22] Filed: June 10, 1974

[21] Appl. No.: 478,033

[30] Foreign Application Priority Data
June 15, 1973    Switzerland.......................... 8666/73

[52] U.S. Cl............................................ 29/116 AD
[51] Int. Cl............................................ B21b 13/02
[58] Field of Search..... 29/113 R, 113 AD, 116 AD

[56] References Cited
UNITED STATES PATENTS

| | | |
|---|---|---|
| 2,908,964 | 10/1959 | Appenzeller............... 29/113 AD X |
| 3,119,324 | 1/1964 | Justus......................... 29/116 AD X |
| 3,581,359 | 6/1971 | Board et al. .................... 29/116 AD |
| 3,703,862 | 11/1972 | Appenzeller............... 29/113 AD X |
| 3,747,181 | 7/1973 | Nykopp et al. ................. 29/113 AD |
| 3,757,398 | 9/1973 | Urban ........................ 29/113 AD X |
| 3,802,044 | 4/1974 | Spillman et al. ............... 29/113 AD |

*Primary Examiner*—Alfred R. Guest
*Attorney, Agent, or Firm*—Pennie & Edmonds

[57] ABSTRACT

The space between the shell and bearer is subdivided and sealed off in a region about the hydrostatic supporting elements in order to contain a bath of the hydraulic medium. The sealed space communicates via a discharge pipe to the exterior and a throttle is installed in the pipe to effect a predetermined back pressure in the bath of hydraulic medium.

3 Claims, 3 Drawing Figures

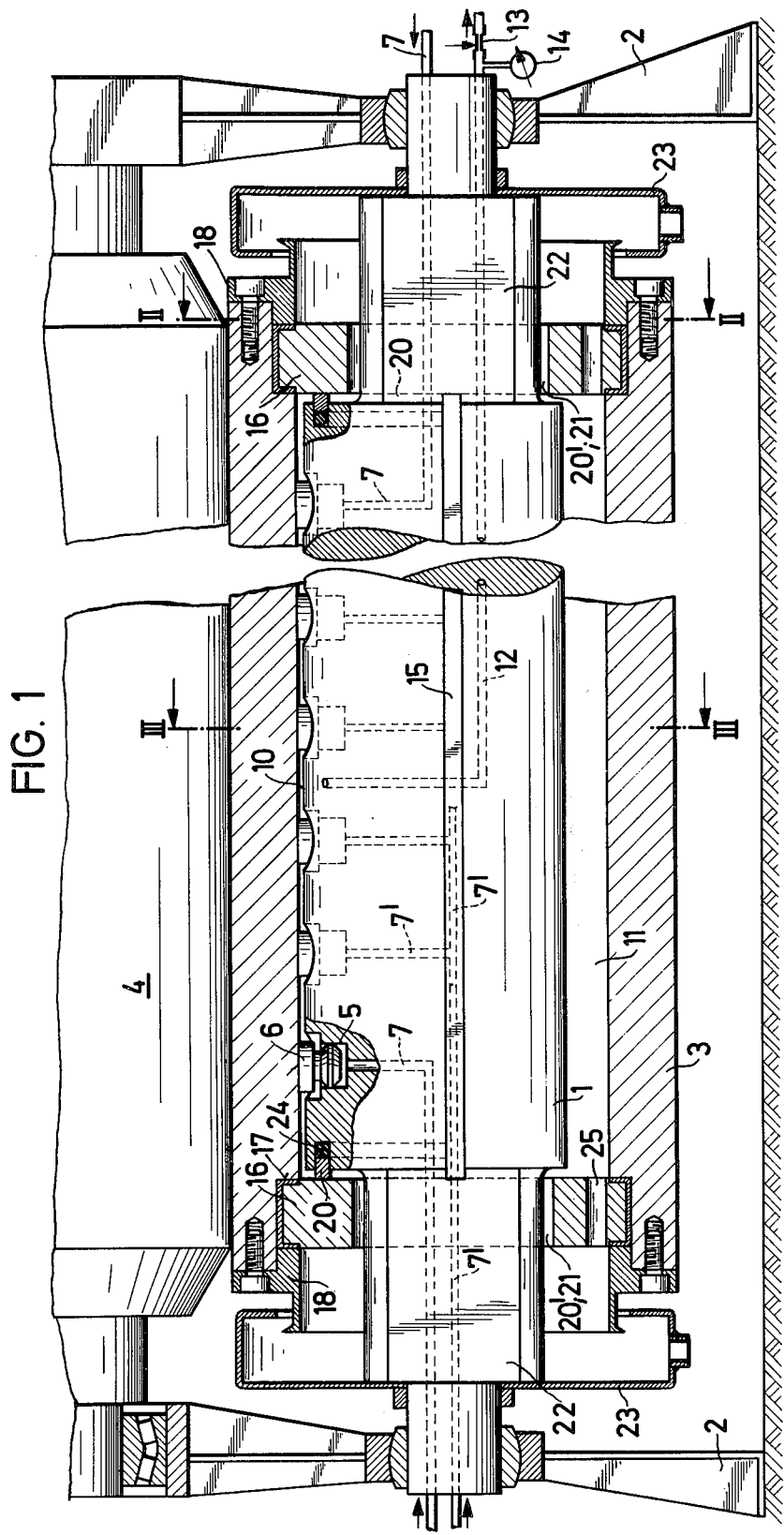

ROLL FOR A ROLLING MILL

This invention relates to a roll for a rolling mill.

Rolls for rolling mills have been known to have a fixed bearer in which hydrostatic supporting elements are guided transversely of the axis of the bearer in order to mount a cylindrical casing or shell in rotatable fashion about the bearer. The hydrostatic supporting elements have usually been connected to at least one source of hydraulic pressurizing medium so that the elements can be pressed against the shell and, as a result, the shell against a coacting roll. The pressurizing medium has also simultaneously caused a lubrication of the bearing surfaces of the supporting elements and of the shell. Such a roll has already been proposed, inter alia, in Swiss Patent Application Nos. 15679/72, 15680,72, 1794/73, 6697/73, 6849/73 and U.S. Pat. No. 3,802,044.

The present invention is concerned with a further development of this roll and has for its object the improvement of the operational reliability and operating properties of the roll.

Briefly, the invention provides a roll with a rotatable cylindrical shell, a fixed bearer within the shell which defines an intermediate space with the shell, a plurality of hydrostatic supporting elements which are movably mounted in the bearer to support the shell on the bearer and which have at least one bearing surface supporting the shell, and at least one source of hydraulic pressurized medium connected to the supporting elements to press the elements against the shell and to simultaneously lubricate the bearing surfaces between the elements and shell. The roll further has means for sealing a region of the intermediate space between the shell and bearer and surrounding the supporting elements from the remainder of the space, a discharge pipe communicating this region with the exterior of the roll to expel hydraulic medium from the region and a throttle member in the discharge pipe for setting a predetermined back-pressure in the hydraulic medium in the sealed-off region.

In this connection, a roll is known from German Auslegeschrift No. 1,026,609, with which a part of an intermediate space between a bearer and a shell is sealed off by packings and is connected to a supply of hydraulic pressurized medium. This known construction, however, has the specific disadvantage of being able to exert a pressure which is only constant axially of the shell. This is not desirable in all cases. In addition, the construction has a comparatively high consumption rate of pressurized medium due to a leakage flow past the packings.

By combining the features of the known arrangements, the present invention provides particular advantages by which the running properties and the operational reliability of the roll are improved. For example, by a choice of the arrangement of the hydrostatic supporting elements, it is possible for the pattern of the pressure-applying force along the roll to be chosen substantially as desired. In many cases, it is desirable to have a smaller pressure-applying force exerted by the hydrostatic elements in the region of the ends of the rolls in order to prevent end pressure. The sealed region of the intermediate space can, in this case, be fed by pressurized medium flowing from the supporting elements and consequently does not require any separate supply arrangement. A reduction in the consumption of hydraulic pressurized medium for a given pressure applying force is even obtained by the series connection of the supporting elements and of the sealed-off region. In addition, the pressurized medium which is in the sealed-off region causes a balancing of temperature along the roll shell and, in addition, improves the lubrication of the bearing surfaces of the support elements and of the shell, since these surfaces are running in an oil bath.

The hydrostatic supporting elements can advantageously be arranged with their axes in one plane, the sealed-off region being symmetrical with this plane. In this way, clearly defined relationships concerning the direction of force of the roll are obtained along with a simultaneous minimum loading of the roll shell as regards flexure. However, it is understood that other arrangements are also possible. For example, the supporting element can be arranged in several rows.

As already mentioned, it is possible for the hydrostatic elements to be so arranged in the bearer, constructed, or connected to sources of pressurized medium, that the bearing force developed by the elements between the roll and a coacting roll is larger in the middle region of the roll than at the ends. In this way, the establishment of an end pressure can be counteracted.

These and other objects and advantages of the invention will become more apparent from the following detailed description and appended claims taken in conjunction with the accompanying drawings in which:

FIG. 1 illustrates an axial section of a roll according to the invention with a bearer shown in elevation and in partial sections;

Figure 3:
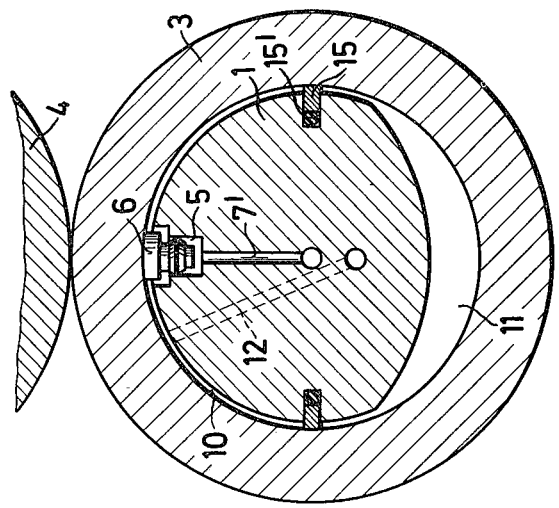
FIG. 3 illustrates a view taken on line III—III of FIG. 2.

Referring to FIG. 1, the roll contains a bearer 1, the ends of which are mounted in supports 2 so that the bearer 1 is fixed. The supports 2 can be set up on the ground or in a machine frame, for exmaple, of a papermaking machine. The bearer 1 is enclosed by a cylindrical roll shell 3, which is pressed against a coacting roll 4, which is likewise mounted in the supports 2 to be rotatable.

In order to support the shell 3 on the bearer 1, bores 5 are formed in the bearer 1 and hydrostatic supporting elements 6 are movably mounted in the bores 5. Each hydrostatic supporting element 6 is in the form of a piston which is guided with a sealing action in a lower part of a bore 5 and which has at least one bearing surface supporting the shell 3. This part of the bore 5 forms a cylinder to which a hydraulic pressurized medium is fed through a pipe 7 from a suitable source of hydraulic pressurized medium. The force which acts on the piston 6 forces the piston against the shell 3 and, consequently, also forces the shell 3 against the coacting roll 4. Those surfaces of the pistons 6 which face the internal surface of the shell 3 can be provided with recesses for a hydrostatic bearing, which recesses are fed in a known manner (not shown) with pressurized medium from the lower part of the bore 5.

As shown, the hydrostatic supporting elements 5, 6 are arranged in a row and are split up into two groups with respect to the supply of hydraulic pressurized medium. While the two outer supporting elements are connected to pressure medium lines 7, those supporting elements which are situated between the outer elements are connected to a common line 7″. In order to obtain a reduction in the edge pressure at the ends of the rolls, the pressurized medium can be fed at a higher pressure to the line 7′ than to the lines 7.

Figure 2:
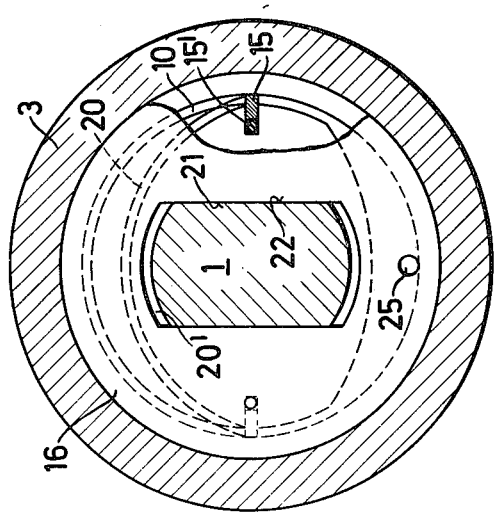
FIG. 2 illustrates a view taken on line II—II of FIG. 1 with a part broken away.

Referring to FIGS. 1 to 3, a means is provided for sealing a region 10 of the intermediate space between the bearer 1 and the shell 3 and surrounding the supporting elements 5, 6 is sealed off from the remainder 11 of the space and also outwardly. The sealed-off region 10 is connected to a discharge pipe 12 which is formed in the bearer 1 to communicate the region 10 with the exterior of the roll, for example, into a chamber at atmospheric pressure. A throttle member 13 is disposed in the pipe 12 for setting a predetermined back-pressure in the hydraulic medium in the region 10. A pressure gauge 14 is connected to the pipe 12 before the throttle member 13 by means of which it is possible to measure the pressure in the region 10. The means for sealing includes packing strips 15 which extend axially of the bearer 1 and of the shell 3. The strips are pressed by resilient means 15′, e.g. a rubber cord, against the inside wall of the shell 3.

In addition, the internal volume of the shell 3 at the ends is sealed off by closure discs or washers 16, which are mounted to be rotatable in the shell 3 between a shoulder 17 and a cover 18. The washers 16 are formed with elongated openings 20′ (FIG. 2) which are limited by planes 21 and are guided along flat surfaces 22 of the bearer 1. The openings 20′ and the surfaces 22 permit a movement of the washers 16 together with the shell 3 in the pressurizing direction of the elements 5, 6. In this way, the closure washers 16 permits a rotation of the shell 3. In order to seal off the region 10 from the closure washers 16, arcuate sealing or packing strips 20 are provided. These strips 20 are pressed by resilient elements 21, which may likewise be rubber cords, against the wall of the closure washers 16.

As will be clear from FIG. 1, bores 22 are formed in the closure washers 16 for carrying the discharging hydraulic medium out of the intermediate space 11. In addition, collecting containers 23 are arranged at the ends of the roll shell 3 with discharge openings connected to a reservoir (not shown) for the hydraulic medium.

In operation, hydraulic pressurized medium at a suitable pressure or at different pressures is fed to the supporting elements 5, 6 through the pipes or lines 7 and 7′. The pressurized medium, normally oil under pressure, leaving the supporting elements 5, 6, on the one hand, due to leakage flow along the pistons 6 and, on the other hand, between the bearing surfaces of the pistons 6 and the shell 3, is collected in the region 10 of the intermediate space by the packing strips 15 and 20. A back-pressure is established in the space 10, the value of which can be influenced by the throttle member 13. The bearing pressure acting on the coacting roll 4 is thus composed of the pressurizing force of the supporting elements 5, 6 and of the pressurized medium acting in the region 10.

The pressurized forces of the supporting elements 5, 6 can be reduced by that amount of the pressurizing force which is established by the back-pressure in the region 10. These forces can consequently be used in an advantageous manner to influence the pattern of the pressure-applying force along the roll shell, which otherwise is not possible by the sealed-off region 10 alone. This region 10 is only capable of supplying a pressure-applying force which is constant axially of the shell, but this however is not desirable in all cases. Because of an unavoidable flexing of the coacting roll 4, it is in fact necessary to reduce the bearing force at the ends of the roll, so that no increased end pressure is established.

The sealed-off region 10 filled with oil under pressure offers additional advantages for the supporting elements 5, 6 and thus for the operation of the roll. The oil bath formed in the space 10 causes a balancing of the temperature along the inside wall of the shell 3, by means of a cooling or heating, respectively, of the flow paths. It is also advantageous with respect to the running conditions of the bearing surfaces of the pistons 6 and shell 3, if these surfaces are in an oil bath. Finally, the series connection of the supporting elements 5, 6 within the sealed-off region 10 leads to a reduction in the total consumption of pressurized medium with a given pressure-applying force of the roll.

The required, constant development of the pressure-applying force can also be achieved by using supporting elements which have different piston diameters and/or supporting elements arranged at different spacings from one another.

What is claimed is:

1. A roll for a rolling mill comprising
a rotatable cylindrical shell;
a fixed bearer within said shell and defining an intermediate space therewith;
a plurality of hydrostatic supporting elements movably mounted in said bearer to support said shell on said bearer, said elements each having at least one surface facing a surface of said shell;
at least one source of hydraulic pressurized medium connected to said elements to press said elements against said shell and simultaneously lubricate said surfaces of said elements and said shell;
means for sealing a region of said intermediate space between said shell and said bearer and surrounding said elements from the remainder of said space;
a discharge pipe communicating said region with the exterior of said roll to expel hydraulic medium from said region; and
a throttle member in said discharge pipe for setting a predetermined back-pressure in the hydraulic medium in said region.

2. A roll as set forth in claim 1 wherein said elements are disposed with an axis of each in a common plane and said region is symmetrical with said plane.

3. A roll as set forth in claim 1 which further comprises means for effecting a greater pressure-applying load on said elements in the middle of said bearer than on said elements at each end of said bearer.

* * * * *